(12) United States Patent
Bandea et al.

(10) Patent No.: US 10,838,594 B2
(45) Date of Patent: Nov. 17, 2020

(54) METHOD OF CONTROLLING A USER INTERFACE

(71) Applicant: Océ Holding B.V., Venlo (NL)

(72) Inventors: Vasile Bandea, Timisoara (RO); Alina-Monica Toma, Timisoara (RO)

(73) Assignee: CANON PRODUCTION PRINTING HOLDING B.V., Venlo (NL)

( * ) Notice: Subject to any disclaimer, the term of this patent is extended or adjusted under 35 U.S.C. 154(b) by 0 days.

(21) Appl. No.: 16/452,221

(22) Filed: Jun. 25, 2019

(65) Prior Publication Data

US 2020/0012397 A1     Jan. 9, 2020

(30) Foreign Application Priority Data

Jul. 3, 2018   (EP) .................................... 18181373

(51) Int. Cl.
    *G06F 9/451*         (2018.01)
    *G06F 3/0484*       (2013.01)
    *G06F 3/0482*       (2013.01)

(52) U.S. Cl.
    CPC .......... *G06F 3/0484* (2013.01); *G06F 3/0482* (2013.01); *G06F 9/451* (2018.02)

(58) Field of Classification Search
CPC combination set(s) only.
See application file for complete search history.

(56) References Cited

U.S. PATENT DOCUMENTS

| | | | | |
|---|---|---|---|---|
| 5,771,042 A * | 6/1998 | Santos-Gomez | ..... | G06F 3/0481 715/792 |
| 5,819,055 A | 10/1998 | MacLean et al. | | |
| 6,310,631 B1 * | 10/2001 | Cecco | ................... | G06F 3/0481 715/792 |
| 7,418,669 B2 * | 8/2008 | Melzer | .................... | G06F 9/451 715/798 |
| 8,984,439 B2 * | 3/2015 | O'Byrne | ................. | G06F 9/451 715/798 |
| 9,037,997 B2 * | 5/2015 | Ording | .................. | G06F 3/0481 715/790 |
| 9,069,434 B1 * | 6/2015 | Kuscher | ................ | G06F 3/0481 |
| 9,489,216 B2 * | 11/2016 | Walter | .................... | G06F 9/451 |

(Continued)

OTHER PUBLICATIONS

European Search Report, issued in Application No. 18 18 1373, dated Dec. 18, 2018.

*Primary Examiner* — Hien L Duong
(74) *Attorney, Agent, or Firm* — Birch, Stewart, Kolasch & Birch, LLP

(57) ABSTRACT

A method of controlling a user interface having a screen and being arranged to display a plurality of display items on the screen simultaneously in a configurable layout, the layout specifying at least one of: a selection of display items to be displayed simultaneously; a configuration of windows that are assigned to the display items to be displayed; and a level of detail for at least one of the display items to be displayed. The method further includes selecting a subset of said plurality of display items; entering a single command for concurrently changing, for each display item in the subset, at least one of the configuration of windows and the level of detail; and for each display item in the subset, translating the single command into an item-specific command adapted to the display item, and executing the item-specific command.

8 Claims, 6 Drawing Sheets

(56) References Cited

U.S. PATENT DOCUMENTS

| | | | |
|---|---|---|---|
| 9,696,880 B2* | 7/2017 | Monnig | G06F 3/0484 |
| 9,841,878 B1* | 12/2017 | Morris | G06F 3/04842 |
| 9,996,212 B2* | 6/2018 | Sun | G06F 3/0481 |
| 10,209,858 B2* | 2/2019 | Yook | G06F 3/0481 |
| 10,397,639 B1* | 8/2019 | Morris | G06F 3/04842 |
| 10,402,034 B2* | 9/2019 | Kaufthal | G06F 3/0484 |
| 2004/0230917 A1* | 11/2004 | Bales | G06F 3/0481 715/854 |
| 2005/0044485 A1* | 2/2005 | Mondry | G06T 11/60 715/247 |
| 2007/0208996 A1* | 9/2007 | Berkner | G06F 40/106 715/210 |
| 2009/0013281 A1* | 1/2009 | Helfman | G06Q 10/10 715/788 |
| 2009/0089660 A1* | 4/2009 | Atkins | G06F 40/106 715/243 |
| 2011/0001605 A1* | 1/2011 | Kiani | G06F 3/0482 340/5.6 |
| 2011/0016432 A1* | 1/2011 | Helfman | G06F 3/0482 715/843 |
| 2011/0113363 A1* | 5/2011 | Hunt | G06F 3/0481 715/800 |
| 2012/0226971 A1* | 9/2012 | Tocchini | G06F 16/9577 715/234 |
| 2012/0278764 A1* | 11/2012 | Arriola | G06F 16/44 715/835 |
| 2013/0097416 A1* | 4/2013 | Barra | G06F 9/4451 713/100 |
| 2014/0089833 A1* | 3/2014 | Hwang | G06F 3/04817 715/769 |
| 2014/0149931 A1* | 5/2014 | Miki | G06F 9/451 715/803 |
| 2014/0164989 A1* | 6/2014 | Kuhne | G06F 3/0488 715/790 |
| 2014/0189592 A1 | 7/2014 | Benchenaa et al. | |
| 2014/0380232 A1* | 12/2014 | Sarnoff | G06F 3/0482 715/781 |
| 2015/0040026 A1* | 2/2015 | Sergunin | H04L 67/22 715/745 |
| 2016/0092084 A1* | 3/2016 | Dyar | G06F 3/0481 715/765 |
| 2017/0010764 A1 | 1/2017 | Francisco et al. | |
| 2017/0168683 A1* | 6/2017 | Yu | G06F 3/0484 |
| 2017/0308278 A1* | 10/2017 | Coble | G06F 3/04842 |

\* cited by examiner

| Default |
|---|
| Peter |
| Paul |
| Mary |
| new layout |

| user list | |
|---|---|
| user name | prototype |
| Peter | Peter |
| Paul | Paul |
| Mary | Mary |
| Frank | Peter |
| Adam | Paul |
| Eve | Peter |

METHOD OF CONTROLLING A USER INTERFACE

FIELD OF THE INVENTION

The present invention relates to a method of controlling a user interface having a screen and being arranged to display a plurality of display items on the screen simultaneously in a configurable layout, the layout specifying at least one of:
- a selection of display items to be displayed simultaneously;
- a configuration of windows that are assigned to the display items to be displayed; and
- a level of detail for at least one of the display items to be displayed.

BACKGROUND OF THE INVENTION

Screen-based graphic user interfaces are frequently used for operating electronically controlled apparatus or systems such as, for example, a document processing system or a printing system. Depending upon the complexity of the system, the user interface may be utilized by a plurality of users who may have different functions and responsibilities, different needs, different skills and/or different authorizations. It is therefore convenient to customize the layout of the graphical user interface in accordance with the needs of individual users or groups of users.

In a conventional user interface, a procedure for customizing the layout comprises the steps of selecting a display item, entering the settings that determine the window configuration and the level of detail for that display item, and repeating these steps for each display item the user is interested in.

It is an object of the present invention to provide a method by which the layout of the user interface can be customized for efficiently.

SUMMARY OF THE INVENTION

In order to achieve that object, the method according to the present invention comprises the steps of:
- selecting a subset of said plurality of display items;
- entering a single command for concurrently changing, for each display item in the subset, at least one of the configuration of windows and the level of detail; and
- for each display item in the subset, translating the single command into an item-specific command adapted to the display item, and executing the item-specific command.

The present invention is based on the consideration that a user who is particularly interested in a certain set of display items will frequently want to make the same or similar settings for these display items in order to, for example, increase the size of the windows in order to improve the visibility of the display items of interest. Similarly, the user may want to increase the level of detail for all the display items she is interested in.

According to the present invention, these setting adjustments for an entire set of display items can be achieved by entering a single command which will then apply equivalently for all the selected items. It should be noted that the effects of the single command on the different display items will be similar to each other but not necessarily identical. For example, if the user wants to scale the width of the windows assigned to the display items, the single command may comprise a scaling factor that is to be applied to all items, whereas the zero point of the scaling operation may be different for different display items. In general, the single command may comprise one or more parameters that apply to all selected items in common, whereas other parameters are specific for each display item. Thus, translating the single command into item-specific commands includes combining the parameter or parameters that are common to all selected items with the respective item-specific parameters. In this way, although the exact setting adjustments for each display item are different from each other, it is possible to make the adjustments for all the selected items efficiently in a single operation.

More specific optional features of the invention are indicated in the dependent claims.

Changing the settings for the configuration of windows may involve scaling all the windows assigned to the selected items in either direction (horizontal or vertical) or in both directions, possibly combined with an automatic rearrangement of the windows in order to sure that the windows will fit into the display area of the screen, and possibly with concurrent reduction of the size of windows for items that have not been selected.

Frequently, the information contained in a single display item will have a hierarchical structure with two or more hierarchical levels. In that case, changing the level of detail may include changing the number of hierarchical levels to be displayed.

If the information contained in a display item does not have a hierarchical structure or if a level of detail has to be specified for sub-items on the same hierarchical level, it is possible to assign a priority to each sub-item and to order the sub-items by priority. Then, changing the level of detail may include restricting the sub-items to be displayed to a number of sub-items with the highest priorities.

Once a customized layout of the user interface has been established, it may be useful to store that layout for future use by the same user or for another user with the same or similar needs.

If the apparatus or system to be operated has means for automatically identifying a user or a class of users, e.g. by digital face recognition, reading RFID or blue-tooth tags, reading a chip card, or the like, a layout to be used may be recalled automatically dependent upon the result of the identification of the user.

BRIEF DESCRIPTION OF THE DRAWINGS

Embodiment examples will now be described in conjunction with the drawings, wherein.

DETAILED DESCRIPTION OF EMBODIMENTS

Figure 1:
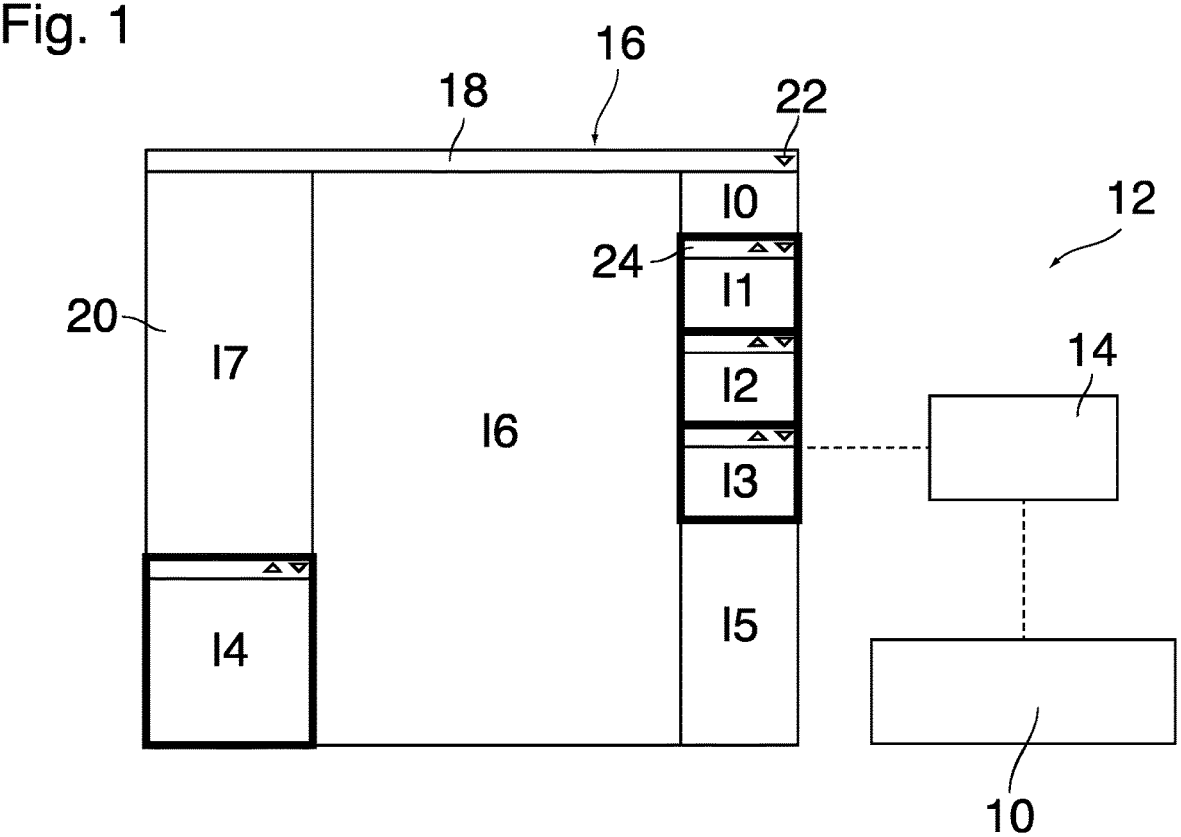
FIG. 1 is a block diagram of a system to be controlled, and an associated user interface.

FIG. 1 is a block diagram in which a system to be controlled, the system being a printing system 10 in this example, has been represented by a single block. An associated user interface 12 comprises an interface controller 14, also represented by a single block, and a screen 16 which has been shown in greater detail. The screen 16 serves as a graphical output device of the user interface 12 but may also be configured as a touch-sensitive screen, so that it can serve as an input/output device for entering commands and for displaying messages to be output to a user. In another embodiment, a separate input device may be provided, e.g. in the form of a keyboard and a mouse.

The screen 16 is controlled by the interface controller 14 which is configured for wireless or wired communication with electronic controllers of various components of the printing system 10.

It will be noted that the user interface 12 may for example be formed by a wireless mobile device such a smartphone with a suitable software application loaded therein and configured for wireless communication with the printing system 10.

In the example shown in FIG. 1, the display area of the screen 16 is divided into a control bar 18 at the top margin and a number of windows 20 which a reserved for displaying various display items I0-I7. The display items I0-I7 may comprise for example general information on the printing system 10, status information on each of a plurality of printers in the printing system 10, information on available print and finishing options, a list of print jobs presently waiting for being processed in the printing system 10, possibly with more detailed information on each print job, and the like.

The control bar 18 includes a button 22 for opening a main menu which offers, among others, various options for editing the layout of the graphical user interface, i.e. of the items displayed on the screen. In the example shown in FIG. 1, a user has selected the items I1-I4 for performing a common layout setting operation on these items and their related windows, respectively. The windows of the selected items have been highlighted by a dark black frame. Further, a window-control bar 24 has been shown for each of these windows. The window control bar 24 may be used for opening menus and/or entering commands for subsystems that are related into the respective display items.

Figure 2:
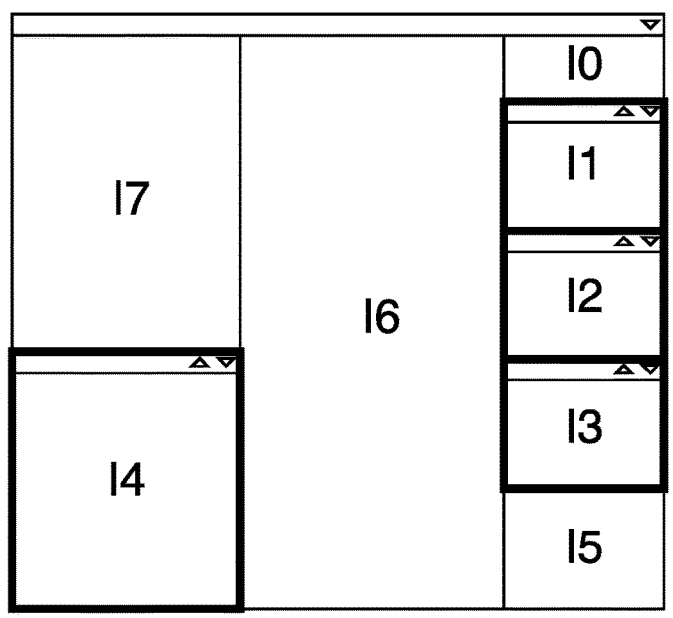
FIGS. 2 to 5 are views of a screen of the user interface with different layouts.

It may be assumed that the user has selected the items I1-I4 because he wants to enlarge the windows 20 that are reserved for these items, whereas the size of the other windows is reduced correspondingly. This can be achieved by entering a single scaling command. The result of such a scaling operation has been shown in FIG. 2. It can be seen that, in FIG. 2, the height and width of the windows related to the items I1-I4 have been scaled (enlarged) by the same factor, whereas the other windows have been shrunk accordingly. It will be observed however that the effect of the scaling operations for the items I1-I3 on the one hand and the item I4 on the other hand are different. In case of items I1-I3, the right margin of the windows has been kept stationary whereas the left margin has moved leftwards towards the center of the screen. In case of item I4, in contrast, the left margin has been kept stationary and the right margin has moved rightwards towards the center of the screen. The size and shape of the windows for the items I0, I5-I7 has automatically been changed accordingly.

Figure 3:
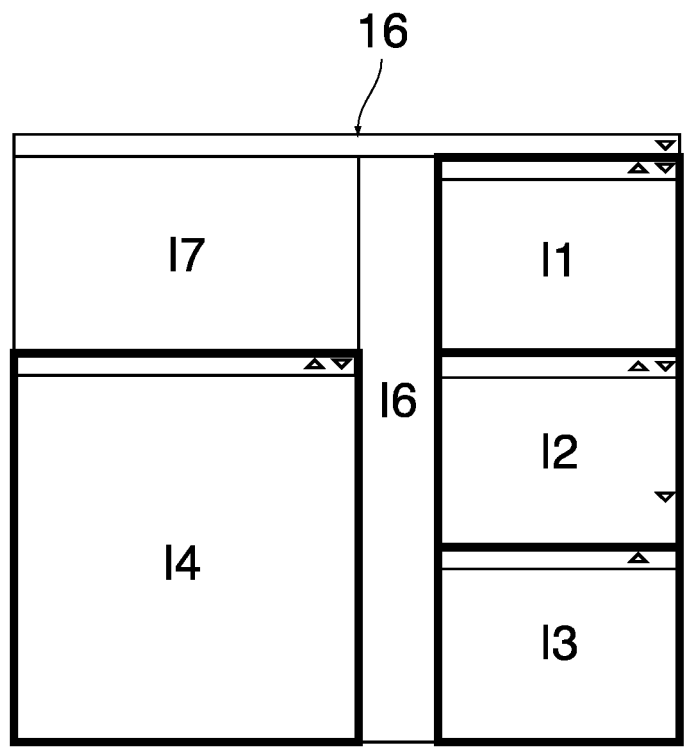

FIG. 3 shows another example where the scaling factor has been increased to a limit at which the height of the windows for I1-I3, together, exhausts the entire height of the screen. As a result, the window for I6 has shrunk to a narrow stripe in which no information can be shown anymore and which therefore will be left empty. The windows for I0 and I5 have been removed completely.

Figure 4:
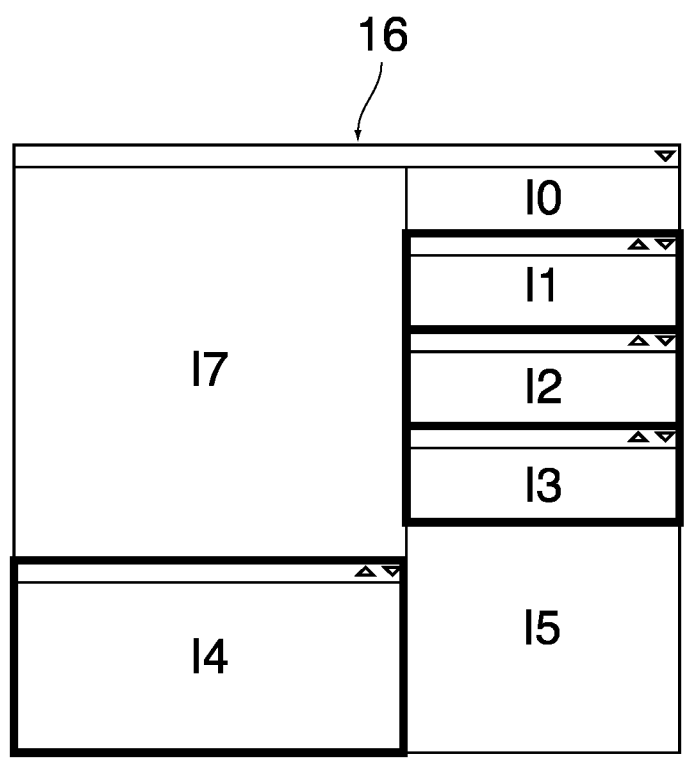

FIG. 4 illustrates another example where the windows for the selected items I1-I4 have been scaled only in horizontal direction. The scaling factor is so large that the window assigned to I6 has disappeared completely.

Optionally, it is possible to protect a window assigned to a certain display item by requiring that the window must always remain on the screen and has a certain size. This will impose limits on the scaling factors that can be applied to the selected items.

Figures 5, 6:
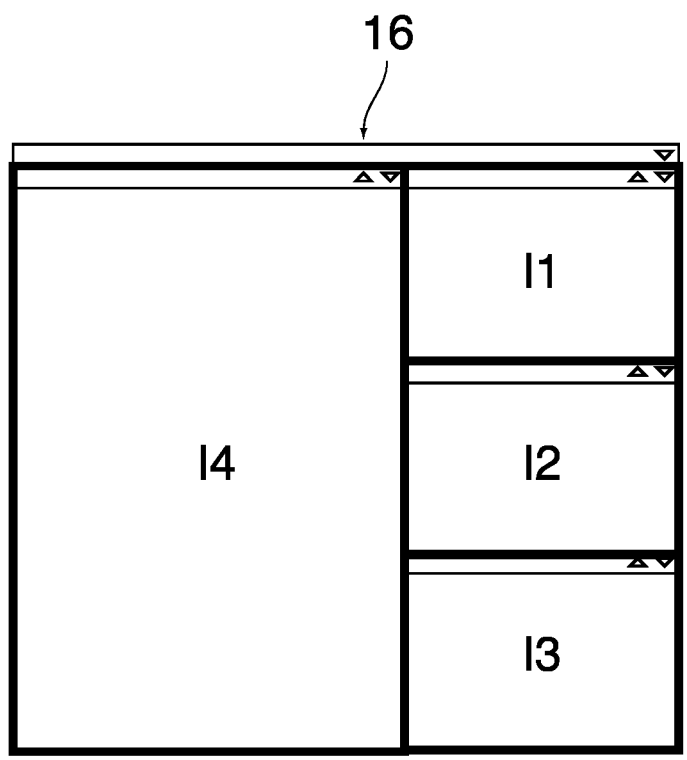
FIG. 6 is an example of a menu for selecting different layouts.

FIG. 5 shows another example in which the window configuration for the selected items I1-I4 has been determined by a command "fill screen". As a result, the windows have been scaled and rearranged such that the four windows of the selected items, together, fill the display area of the screen 16 completely.

FIG. 6 shows an example of a main menu that can be opened by clicking on the button 22 in FIG. 1. The menu offers a selection between a number of different layouts including the layout "Default" that is shown in FIG. 1 as well as three customized layouts that, in this example, are customized for individual users and are named by their users "Peter", "Paul" and "Mary".

The user may also create a new layout by clicking on the menu point "new layout". Then, the user will be prompted to enter a name for the new layout, the screen 16 will switch to the default layout, and the user will be invited to edit that layout. The editing result will automatically be stored under the name entered by the user.

Figure 7:
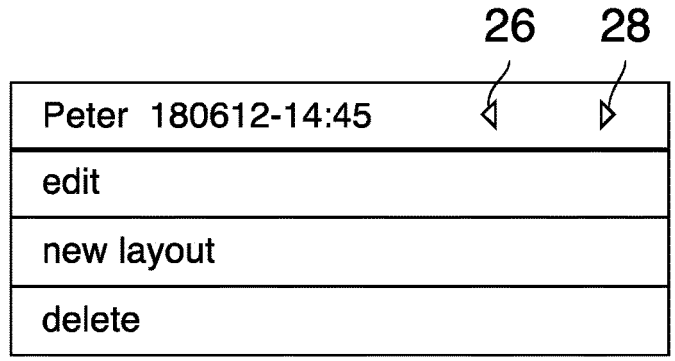
FIG. 7 is an example of a menu for editing a selected layout.

FIG. 7 show a menu that will pop up when the user has selected a customized layout, the layout "Peter" in this example. A date and a time ("180612-14:45") behind the name of the layout indicate the time when last version of the layout "Peter" has been stored. The user may switch into an earlier version by clicking on a button 26 and may switch back to a later version by clicking on a button 28.

A menu point "edit" opens an editing procedure for editing the selected layout. When the editing operation has been completed, the result will automatically stored under the name "Peter" but will have the current date and time.

The menu point "new layout" will also open an editing session, but the result will not be stored as a new version of "Peter" but under a new name to be entered by the user. The difference between this menu point and the menu point "new layout" in FIG. 6 is that, in FIG. 7, the selected layout (version of "Peter") will be taken as the starting point or template for the new layout.

A menu point "delete" offers an option to delete the selected version of the layout "Peter".

Figure 8:
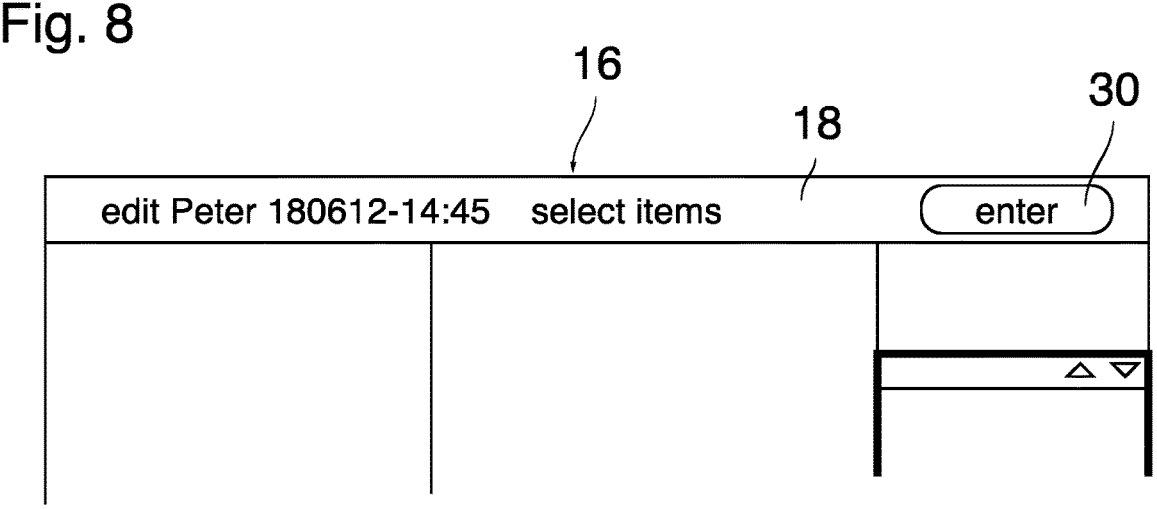
FIG. 8 is an enlarged view of a part of the screen during a first step of editing a layout.
Figure 9:
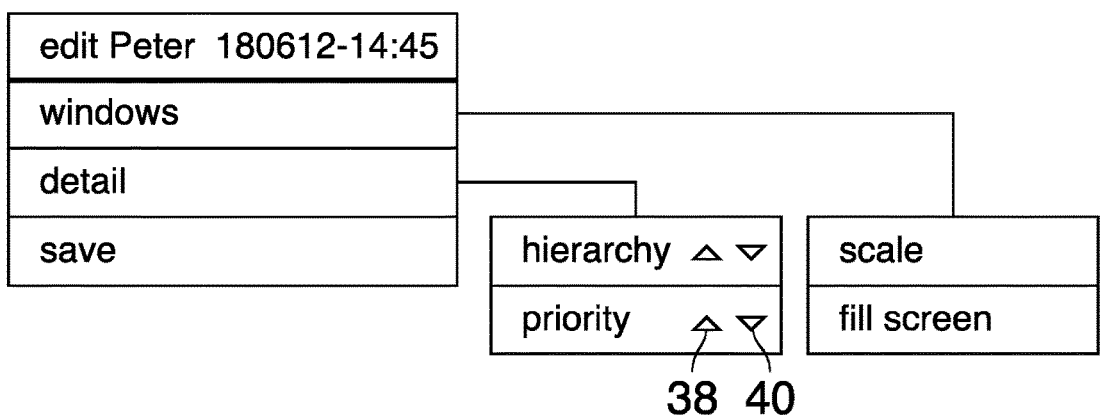
FIG. 9 is an example of a menu structure for different options for changing a layout.
Figure 10:
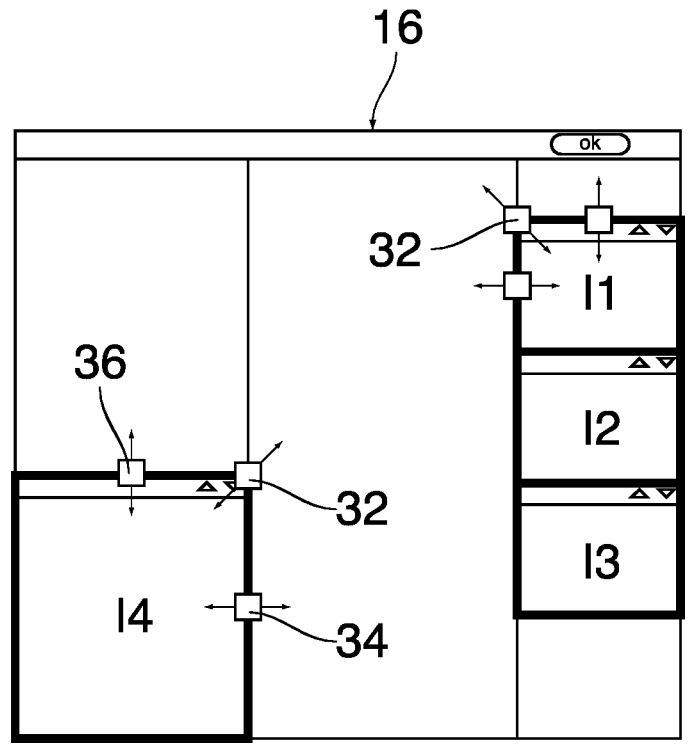
FIG. 10 is a view of a screen during a process of changing a window configuration of the layout.

When the menu point "edit" is selected in FIG. 7, the screen 16 changes into what is shown in FIG. 8. The control bar 18 shows the name and version of the selected layout and invites the user to select a subset of display items. The main part of the screen 16 shows a window structure as specified by the current version of the layout "Peter". The user may select a window and its related display item by clicking into the window. Another click into the same window will deselect the item again. When the user has selected the windows and display items she is interested in, a click onto a button 30 will open a menu with two main menu points "windows" and "detail" as shown in FIG. 9. The menu point "windows" has two sub-menu-points "scale" and "fill screen". When the user clicks on "scale", the screen 16 continues to show the same layout as in FIG. 8, with the subset of windows that have been selected, but with scaling handles 32, 34, 36 added to the window frames of each or some of the selected windows, as shown in FIG. 10. Dragging a scaling handle 32 will have the effect that each of the selected windows is scaled in two dimensions with the same scaling factor. The different scaling handles 32 provided on the corners of different window frames will all have the same effect and have been provided only for convenience. When the user drags one of the scaling handles 34, the selected windows will be scaled only in horizontal direction, all with the same scaling factor. Similarly, the scaling handle 36 is used for scaling the windows in vertical direction. When the user clicks on a button "ok" in the control bar, the result of the scaling operation will be saved as a new version of the layout.

Returning to FIG. 9, when the user clicks on "fill screen", the selected windows will be scaled and rearranged so as to fill the entire display area of the screen as has been illustrated in FIG. 5.

The menu point "detail" in FIG. 9 has two sub-menu points "hierarchy" and "priority", each provided with an increment button 38 and a decrement button 40. The function of these buttons will be explained by reference to FIG. 11, which shows a window for a single display item (I4) as well as a hierarchical structure of information to be shown in that window.

In the example shown, the item (I4) has two level-1 (sub) items "1." and "2." on a highest hierarchy level. Item "1." has two level-2 items "1.1" and "1.2", and each of these has several level-3 items "1.1.1.", etc. Item "2." has only two hierarchy levels and four level-2 items "2.1"-"2.4".

By clicking the buttons 38 and 40 in the menu point "hierarchy", the user may implement or decrement the number of hierarchy levels to be displayed. In the lowest level of detail, the number of hierarchy levels will be "1", and the window shows only the level-1 items "1." and "2.". Then, when the user clicks on the increment button 38 once, the level-2 items will also be shown, and when she clicks on the button 38 once again, the level-3 items will be shown in addition (if there are any). It will be understood that these operations act not only upon the display item I4 shown in FIG. 11 but on all display items that have been selected, as far as the contents of these display items have a hierarchical structure.

It is further assumed here, that the items on each hierarchy level are ordered by their priorities. Thus, item "1." has a higher priority than item "2.", item "2.2" has a higher priority than item "2.3", and so on. The buttons "38" and "40" in the menu point "priority" may be used to change the priority level. For example, if the priority level is "1", then only the level-1 item "1." with the highest priority will be shown (possibly together with its level-2 and level-3 sub-items). If the increment button 38 is used for increasing the priority level to "2", then item "2." with the second highest priority will also be shown, and so on.

In an initial state, the priority levels selected with the menu point "priority" in FIG. 9 will apply to the level-1 items. However, the user may select a particular level-1 item by clicking on that item in FIG. 11. In the example shown, the item "2." has been selected, which is why this item is shown in bold characters. Then, the increments or decrements of the priority level will apply to the level-2 sub-items "2.1"-"2.4". Similarly, when the user selects the level-2 item "1.2" in FIG. 11, the selection of priority levels would apply to the level-2 items "1.2.1" and "1.2.2". In this way, a priority level may be specified for any item on any hierarchy level.

Figure 11:
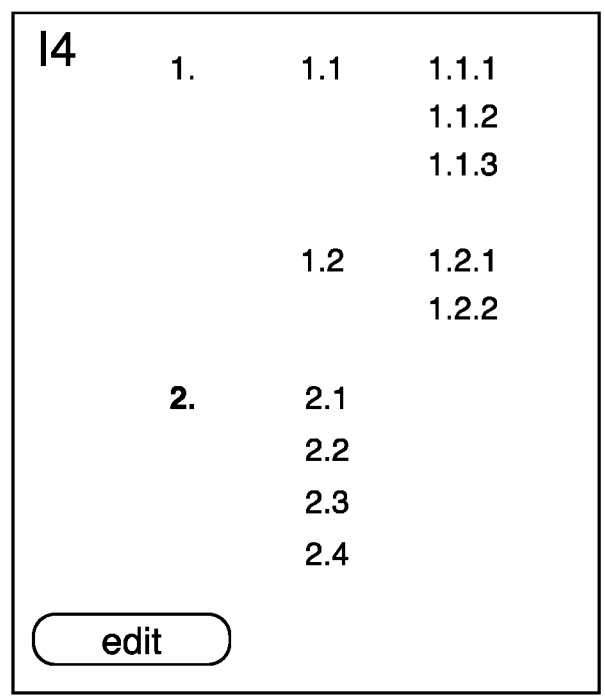
FIG. 11 is an example of a hierarchical structure of a display item to be displayed on the screen.

Further, when the user clicks on a button "edit" in FIG. 11, the ordering of items or sub-items by priority may be changed by moving the items of the next lower hierarchy level up and down. For example, in the condition shown in FIG. 11, with "2." being selected, the user could swop the items "2.1" and "2.2", with the result that, when the priority level is "1", only the item "2.2" would be shown.

Of course, if the information contained in a display item does not have a hierarchical structure, the level of detail can be changed only by changing the priority level.

In the example proposed here, the settings for the number of hierarchy levels to be displayed (menu point "hierarchy") and the settings for the priority level in the highest hierarchy level will apply to all display items that have been selected. In contrast, the settings for the priority levels in the lower hierarchy levels and changes in the priority order of the items may be specific to the display item in consideration, i.e. these settings for display item I4 may be different from the settings for another display item such as I3.

When the desired settings have been made, the user may click on a menu point "save" in FIG. 9, with the result that the settings are saved as a new version of the layout "Peter".

Figures 12, 13:
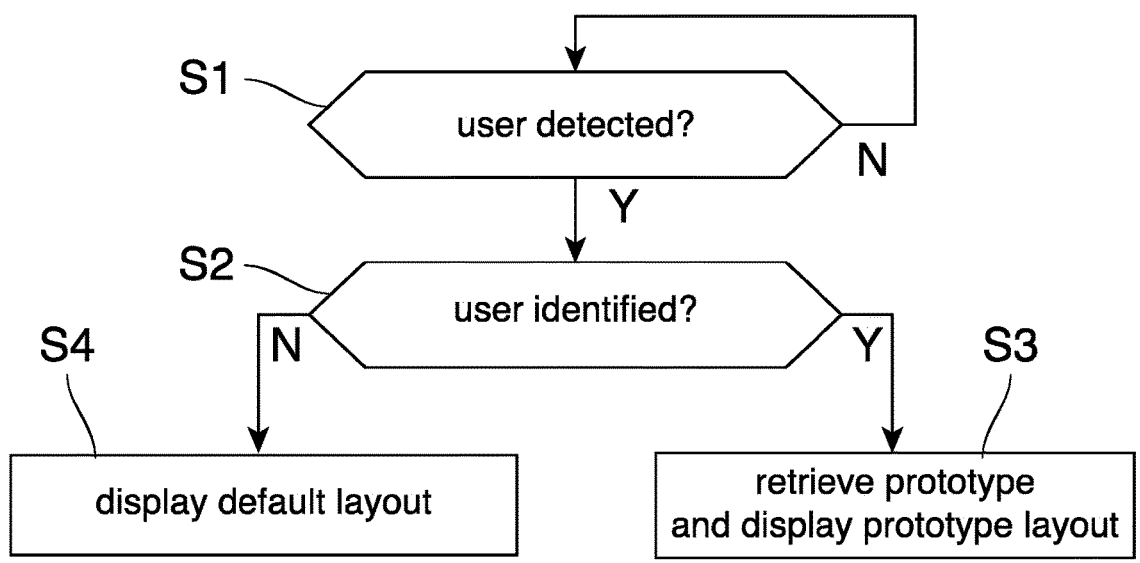
FIG. 12 is an example of a user and layout database.
FIG. 13 is a flow diagram of a process for automatically selecting a layout.

FIG. 12 shows a simple example of a user data base "user list" which includes for each user a user name and a prototype.

In the given example, the data base contains the users "Peter", "Paul", "Mary", "Frank", "Adam" and "Eve". It shall be assumed that Peter is an occasional user who uses the printing system 10 and the user interface 12 just for entering print jobs, making settings for his print jobs and possibly monitoring the progress of his print jobs being worked on. In contrast, Paul is a service engineer in charge for maintenance and service of the printers. Thus, it will be clear that Paul be interested in different information than Peter to be displayed on the user interface. Mary is a system operator in charge of the smooth operation of the entire printing system 10. Accordingly, Mary will be interested in still other pieces of information than Peter and Paul.

The user Frank is another occasional user who will be basically interested in the same information as Peter. For this reason, the same prototype "Peter" has been assigned to the users Peter and Frank. The user Adam is another service engineer, just as Paul, so that the prototype "Paul" is also assigned to Adam. The user Eve is another occasional user and therefore has again the prototype "Peter".

Different layouts have been specified and stored for each prototype. Now, when a user identifies himself as Frank, for example, at the user interface, the interface controller will look up the corresponding prototype "Peter", and will call up the corresponding layout "Peter". Similarly, if a user identifies himself as Adam, the interface controller will automatically call up the layout "Paul".

FIG. 13 illustrates a procedure for automatic detection and identification of users. For example, it may be assumed that a user approaching the printing system 10 is automatically detected by reading an RFID tag that is carried by the user. In step S1 in FIG. 13, it is checked whether a user has been detected, i.e. whether there is a response from any user RFID. As long as that is not the case (N), the step S1 is repeated.

As soon as a user has been detected (Y), a user ID of that user is read from the RFID-Signal, and the interface controller 12 searches the database "user list", and tries to identify the user as one of the listed users. In step S2, it is checked whether this identification was successful. If that is the case (Y), the prototype of that user is retrieved from the database and the corresponding layout is displayed on the screen 16 in step S3. On the other hand, if the user could not be identified in step S2, the default layout (FIG. 1) is displayed on the screen in step S4.

The invention claimed is:

1. A method of controlling a user interface of an electronically controlled apparatus, the user interface having a display screen and being arranged to display a plurality of display items on the display screen simultaneously in a configurable layout, the configurable layout specifying at least one of:
    a selection of display items to be displayed simultaneously;
    a configuration of windows that are assigned to the display items to be displayed; and
    a level of detail for at least one of the display items to be displayed,
    wherein the method comprises the steps of:
        selecting a subset of said plurality of display items;
        entering a single command for concurrently changing, for each display item in the subset, at least one of the configuration of windows and the level of detail, wherein the single command acts on all display items in the selected subset concurrently; and
        for each display item in the subset, translating the single command into an item-specific command adapted to the display item, and executing the item-specific command, such that the same action of said single command is applied to all display items in the selected subset to perform at least one of the following operations:
            concurrently changing for each display item in the subset the configuration of windows; and
            concurrently changing for each display item in the subset the level of detail,
    wherein the number of display items in the selected subset is larger than 1 but smaller than the total number of display items.

2. The method according to claim 1, wherein the single command includes a command for scaling the windows associated with the selected display items in at least one direction with a common scaling factor, with a concurrent reduction of the size of windows assigned to display items that have not been selected.

3. The method according to claim 2, wherein the item-specific commands for the selected display items comprise commands for automatically rearranging the windows for the selected display items so as to fit into a display area of the screen.

4. The method according to claim 1, wherein contents of at least two of the display items have a hierarchical structure, and the single command comprises specifying a maximum number of hierarchy levels to be displayed for each of the selected display items.

5. The method according to claim 1, wherein the contents of at least two of display items comprise a list of sub-items ordered by decreasing priority, the single command includes a command for setting a common priority level for all selected display items, and the item-specific commands comprise commands for displaying, for each display item, only the sub-items with the highest priority in a number as specified by the priority level.

6. The method according to claim 1, comprising a step of saving a layout once it has been configured.

7. The method according to claim 6, comprising a step of storing a list of users of the user interface and assigning a layout prototype to each user in the list, the method further comprising a step of identifying a user and automatically selecting a layout in accordance with the layout prototype assigned to the identified user.

8. A method of controlling a user interface of an electronically controlled apparatus, the user interface having a display screen and being arranged to display a plurality of display items on the display screen simultaneously in a configurable layout, the configurable layout specifying:
    a selection of display items to be displayed simultaneously;
    a configuration of windows that are assigned to the display items to be displayed; and
    a level of detail for at least one of the display items to be displayed,
    wherein the method comprises the steps of:
        selecting a subset of said plurality of display items;
        entering a single command for concurrently changing, for each display item in the subset, at least one of the configuration of windows and the level of detail, wherein the single command acts on all display items in the selected subset concurrently; and
        for each display item in the subset, translating the single command into an item-specific command adapted to the display item, and executing the item-specific command, such that the same action of said single command is applied to all display items in the selected subset to perform at least one of the following operations:
            concurrently changing for each display item in the subset the configuration of windows; and
            concurrently changing for each display item in the subset the level of detail,
    wherein the number of display items in the selected subset is larger than 1 but smaller than the total number of display items.

* * * * *